United States Patent
Wang et al.

(10) Patent No.: US 8,103,494 B2
(45) Date of Patent: Jan. 24, 2012

(54) MANAGEMENT SYSTEMS AND METHODS

(75) Inventors: Derek Wang, Hsinchu (TW); Kun-Chi Liu, Chiayi (TW); Ta-Chin Lin, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1815 days.

(21) Appl. No.: 11/292,628

(22) Filed: Dec. 2, 2005

(65) Prior Publication Data

US 2007/0128892 A1 Jun. 7, 2007

(51) Int. Cl.
- *G06F 17/50* (2006.01)
- *G06F 11/30* (2006.01)
- *G06F 19/00* (2011.01)

(52) U.S. Cl. .......................... 703/13; 702/182; 700/121

(58) Field of Classification Search .................. None
See application file for complete search history.

(56) References Cited

U.S. PATENT DOCUMENTS

| | | | |
|---|---|---|---|
| 6,477,685 B1 * | 11/2002 | Lovelace | 716/4 |
| 6,807,655 B1 * | 10/2004 | Rehani et al. | 716/4 |
| 7,167,811 B2 * | 1/2007 | Tabor | 702/183 |
| 7,222,255 B1 * | 5/2007 | Claessens et al. | 714/4 |
| 7,266,476 B2 * | 9/2007 | Coburn et al. | 702/183 |
| 7,437,271 B2 * | 10/2008 | Tabor | 702/183 |
| 2007/0168065 A1 * | 7/2007 | Nixon et al. | 700/97 |

* cited by examiner

*Primary Examiner* — Mussa A Shaawat

(74) *Attorney, Agent, or Firm* — Thomas|Kayden

(57) ABSTRACT

A management system and method. The system comprises at least one delivery request, a plurality of equipment and a simulator. The delivery request indicates a plurality of devices, each comprising a respective quantity. The equipment tests the devices, each equipment comprising an equipment configuration. The simulator retrieves device configuration requirements of respective devices, maps the devices to the equipment according to the respective device configuration requirements and the equipment configurations to obtain a mapping result, and calculates at least one performance index based on the mapping result and the quantity of respective devices.

10 Claims, 2 Drawing Sheets

MANAGEMENT SYSTEMS AND METHODS

BACKGROUND

The present disclosure relates generally to management systems and methods, and, more particularly, to systems and methods that manage the mapping between products and equipment.

In product supply, a supply chain supports material purchase, fabrication of materials into intermediate and finished products, and distribution of finished products to clients. Supply chain management has become important in meeting goals of reduced inventory, increased productivity, and enhanced competitiveness. Manufacturing and distribution facilities have limited resources and capacity, however, so not every client request may be met. For example, some requests may be promised but unfulfilled, some clients may experience inadequate supply, and other requests may be rejected. Consequently, effective capacity management in supply chain management, without excess capacity loss, has become important for product suppliers requiring control of manufacture or distribution.

In the supply chain, clients transmit delivery requests (demands) to a supplier. Delivery requests may include a request for a particular quantity of a device by a specific date. The supplier forecasts and plans its internal or external manufacturing schedule according to received delivery requests, and allocates capacity for product manufacture to satisfy each client. After receiving orders corresponding to delivery requests from clients, the supplier begins manufacture of the products.

Before delivering products to clients, products must be tested for quality assurance. During testing, each product (device) has a corresponding test program, comprising a specific equipment configuration requirement, and equipment with the specific configuration can be used to test the product. The configuration may be equipment components, such as CPU (Central Processing Unit), RAM (Random Access Memory) card, PIN count, and others. Effective management in device and equipment mapping is critical for product suppliers. Conventionally, there is no mechanism to evaluate the impact between the devices and equipment when the equipment configuration changes, and no mechanism to automatically and systematically provide suggestions regarding appropriate adjustment of equipment configuration to improve capacity utilization.

SUMMARY

Management systems and methods are provided. An exemplary embodiment of a management system comprises at least one delivery request, a plurality of equipment and a simulator. The delivery request indicates a plurality of devices, each comprising a respective quantity. The equipment tests the devices, each equipment comprising an equipment configuration. The simulator retrieves device configuration requirements of respective devices, maps the devices to the equipment according to the respective device configuration requirements and the equipment configurations to obtain a mapping result, and calculates at least one performance index based on the mapping result and the quantity of respective devices.

In an exemplary embodiment of a management method, at least one delivery request indicating a plurality of devices and a respective quantity thereof, and a plurality of equipment testing the devices are provided. Each of the equipment comprises an equipment configuration. Device configuration requirements of respective devices are retrieved. The devices are mapped to the equipment according to the respective device configuration requirements and the equipment configurations to obtain a mapping result. At least one performance index is calculated based on the mapping result and the quantity of respective devices.

Management systems and methods may take the form of program code embodied in tangible media. When the program code is loaded into and executed by a machine, the machine becomes an apparatus for practicing the disclosed method.

DESCRIPTION OF THE DRAWINGS

The invention will become more fully understood by referring to the following detailed description with reference to the accompanying drawings, wherein.

DESCRIPTION

Figure 1:
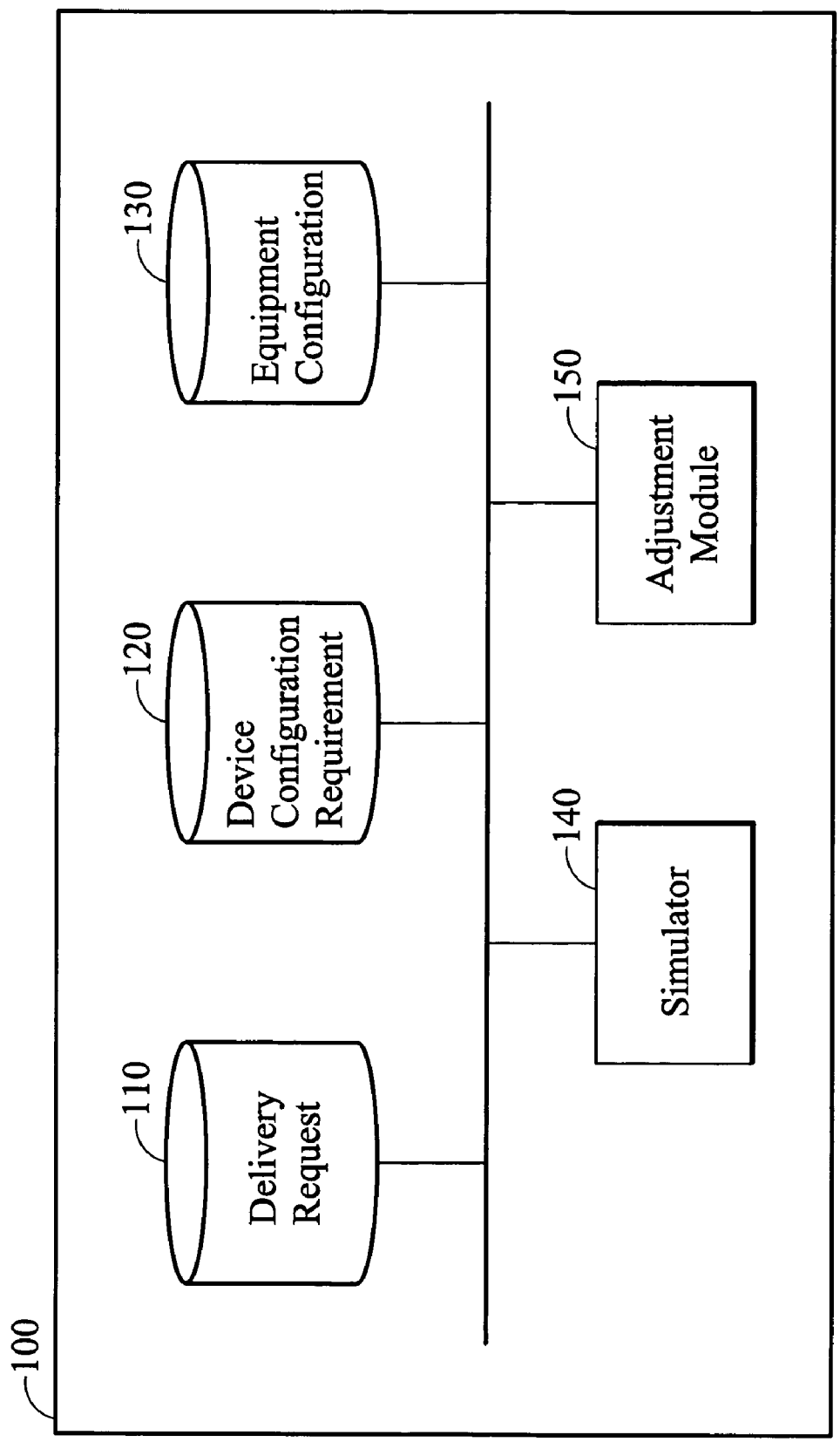
FIG. 1 is a schematic diagram illustrating an embodiment of a management system.

FIG. 1 is a schematic diagram illustrating an embodiment of a management system. The management system 100 includes delivery requests 110, device configuration requirements 120, equipment configurations 130, a simulator 140, and an adjustment module 150. The delivery requests 110 may managed by a request management unit (not shown) of a supply chain management system comprising MES (Manufacturing Execution System), planning system, product database, and others. The delivery requests 110 are received from clients. Each request may indicate a specific quantity of at least one device by a specific date. Respective devices have a corresponding device configuration requirement. The management system 100 can also comprises a plurality equipment tools. Respective equipment has a corresponding equipment configuration. If the equipment configuration conforms to the device configuration requirement, the equipment is capable of process, such as device testing. It is understood that the configuration may be adjustable and the components of the equipment may be expandable.

The simulator 140 maps devices to equipment, and calculates performance indices accordingly. The adjustment module 150 provides configuration changes to the equipment according to the performance indices. The operations of the simulator 140 and adjustment module 150 can be repeated until an expected performance is achieved. A detailed description follows.

Figure 2:
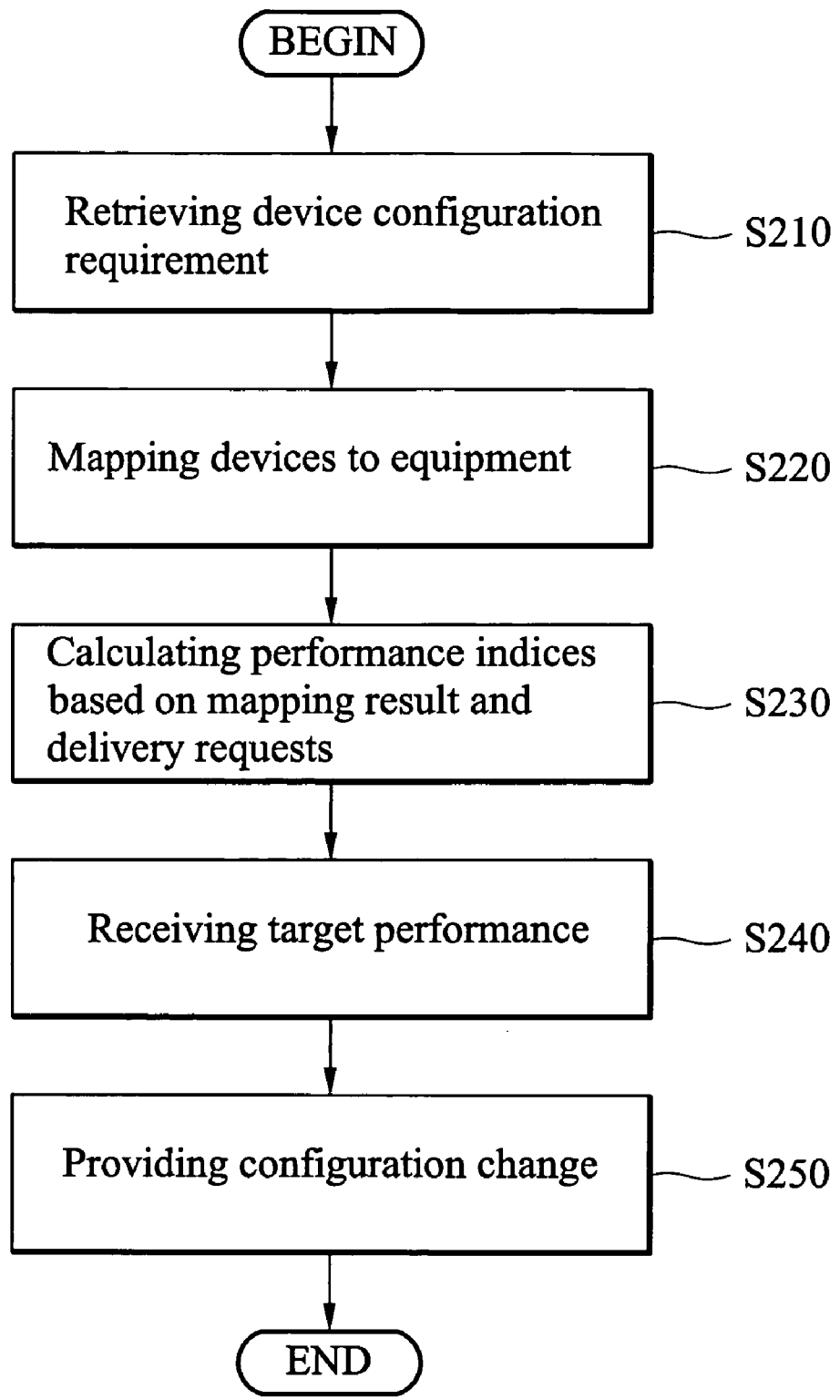
FIG. 2 is a flowchart of an embodiment of a management method.

FIG. 2 is a flowchart of an embodiment of a management method.

First, in step S210, the simulator 140 retrieves device configuration requirements of the devices indicated in the delivery requests. It is understood that some non-key components (configurations) or components that cannot be changed can be filtered out in advance. In step S220, the simulator 140 maps the devices to the equipment according to the respective device configuration requirements and the equipment configurations to obtain and display a mapping result comprising a mapping list recording which devices are mapped by which equipment. It is understood that the devices having no mapped equipment and required components to make the devices to be mapped by equipment are also displayed.

In step S230, the simulator 140 calculates the performance indices based on the mapping result and the delivery requests. Three performance indices are provided in the application, CLIP (Confirm Line Item Performance), CVP (Confirm Volume Performance), and an average mapping ratio.

CLIP is calculated using formula (1).

$$\text{CLIP} = \frac{MD}{TD}, \qquad (1)$$

wherein MD is the number of devices with equipment mapped, and TD is the total number of devices. For example, 3 devices are indicated, and 2 devices are mapped by equipment, CLIP is 200/300=⅔.

CVP is calculated using formula (2).

$$\text{CVP} = \frac{MQD}{TQD}, \qquad (2)$$

wherein MQD is the quantity of devices with equipment mapped, and TQD is the total quantity of devices. For example, 3 devices, A, B and C are indicated, and respective quantity of work pieces is 10, 20 and 30. If only B is mapped by equipment, CVP is 20/10+20+30=20/60=⅓.

The average mapping ratio represents the average number of devices that one equipment maps. For example, 3 devices, A, B and C are indicated, and two equipment tools, EA and EB are available. If equipment EA maps devices A and B, and equipment EB maps device C, the average mapping ratio is (2+1)/2=3/2. It is understood that the delivery request comprises time information, the device candidates for calculating performance indices are in the same time bucket. These performance indices can be used to judge whether the mapping between the devices and equipment are appropriate, and whether the capacity of equipment is well utilized.

In step S240, a target performance is received, and in step S250, the adjustment module 150 provides a configuration change of the equipment according to the performance indices and the target performance. It is understood that the configuration change may be a change of components among the equipment, or additional components added to specific equipment. Additionally, if new components must be added, the adjustment module 150 further calculates a required budget for the required components to make the performance indices to achieve the target performance. It is understood that the price for respective components can be provided in advance. After the configuration change, the simulator 140 can map the devices to the equipment according to the respective device configuration requirements and the changed equipment configurations to obtain another mapping result, and calculate the performance indices based on the mapping result and the deliver requests. It is understood that the simulator 140 further displays the impacted devices after the configuration change. The impacted devices may be devices originally mapped but having lost the mapped equipment after the configuration change, and the devices originally having no mapped equipment and mapped after the configuration change.

Management systems and methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer or a device comprising a mobile phone, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer or a device comprising a mobile phone, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A management system, comprising:
at least one delivery request indicating a plurality of devices, each comprising a respective quantity;
a plurality of equipment to test the devices, each equipment comprising an equipment configuration; and
a simulator configured to retrieve device configuration requirements of respective devices, map the devices to the equipment according to the respective device configuration requirements and the equipment configurations to obtain a mapping result, and calculate at least one performance index based on the mapping result and the quantity of respective devices,
wherein the performance index comprises a CLIP (Confirm Line Item Performance), and the simulator calculates the CLIP according to:

$$\text{CLIP} = \frac{MD}{TD},$$

wherein MD is the number of devices with at least one of the equipment mapped, and TD is the total number of devices, and
wherein the performance index comprises a CVP (Confirm Volume Performance), and the simulator calculates the CVP according to:

$$\text{CVP} = \frac{MQD}{TQD},$$

wherein MQD is the quantity of devices with at least one of the equipment mapped, and TQD is the total quantity of devices.

2. The system of claim 1 wherein the performance index comprises an average mapping ratio, representing the average number of devices mapped by one equipment.

3. The system of claim 1 further comprising an adjustment module configured to provide a configuration change of the equipment according to the performance index.

4. The system of claim 3 wherein the simulator further maps the devices to the equipment according to the respective device configuration requirements and the changed equipment configurations to obtain another mapping result, and calculates the performance index based on the mapping result and the quantity of respective devices.

5. The system of claim 1 wherein the simulator further displays the devices not mapped by the equipment.

6. The system of claim 5 wherein the simulator further displays components required to map the devices by the equipment.

7. The system of claim 5 wherein the adjustment module further calculates a required budget for the required components.

8. The system of claim 5 wherein the simulator further displays required components to map the devices by the equipment, and the adjustment module further receives a target performance, and calculates a required budget for the required components to make the performance index to achieve the target performance.

9. The system of claim 3 wherein the configuration change comprises change of components among the equipment.

10. The system of claim 3 wherein the simulator further displays the impacted devices after the configuration change, in which the impacted devices comprise the devices originally mapped but having lost the mapped equipment after the configuration change, and the devices originally having no mapped equipment and mapped after the configuration change.

* * * * *